July 27, 1943.  W. O. SPRINKLE  2,325,433
BALE LOADING MACHINE
Filed March 20, 1942  2 Sheets-Sheet 1

Inventor
Walter O. Sprinkle.
By Clarence A. O'Brien
and Harvey B. Jacobson
Attorneys Patented July 27, 1943

2,325,433

UNITED STATES PATENT OFFICE 2,325,433

BALE LOADING MACHINE

Walter O. Sprinkle, Galveston, Ind.

Application March 20, 1942, Serial No. 435,565

1 Claim. (Cl. 198—13)

The present invention relates to new and useful improvements in bale loading machines, and has for its primary object to provide, in a manner as hereinafter set forth, novel means for picking up bales of hay, straw, et cetera, which have been left in a field and depositing said bales in a wagon or other vehicle.

Another very important object of the invention is to provide a bale loading machine of the aforementioned character which is adapted to be expeditiously mounted for operation on one side of a conventional tractor and driven from the usual power take-off without the necessity of making material structural alterations in said tractor.

Other objects of the invention are to provide a bale loading machine of the character described which will be comparatively simple in construction, strong, durable, highly efficient and reliable in operation, compact, light in weight, and which may be manufactured at low cost.

All of the foregoing and still further objects and advantages of the invention will become apparent from a study of the following specification, taken in connection with the accompanying drawings wherein like characters of reference designate corresponding parts throughout the several views, and wherein.

Figures 1, 3:
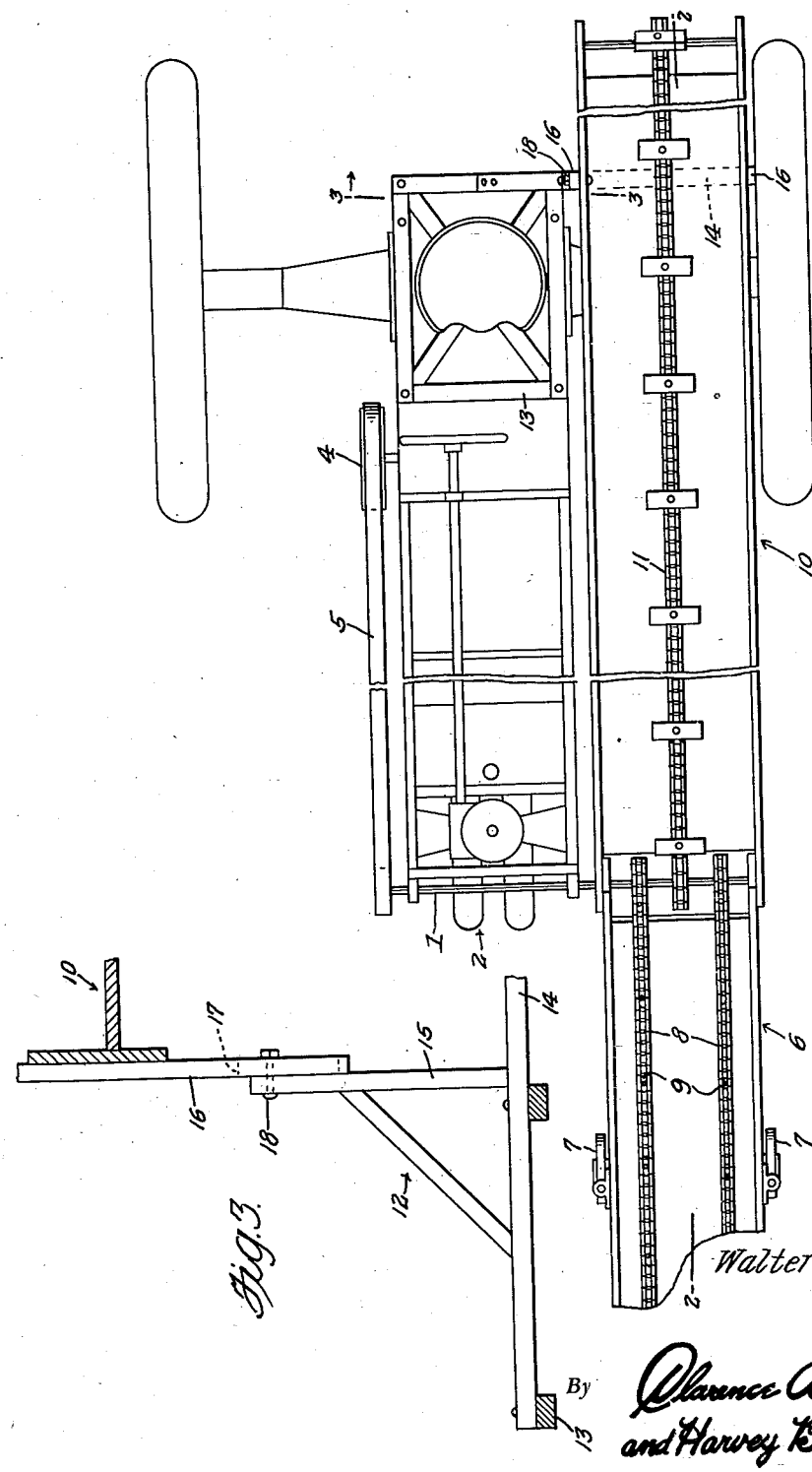
Figure 1 is a top plan view, showing a bale loading machine constructed in accordance with the present invention mounted on a tractor.
Figure 3 is a cross-sectional view, taken substantially on the line 3—3 of Figure 1.
Figure 2:
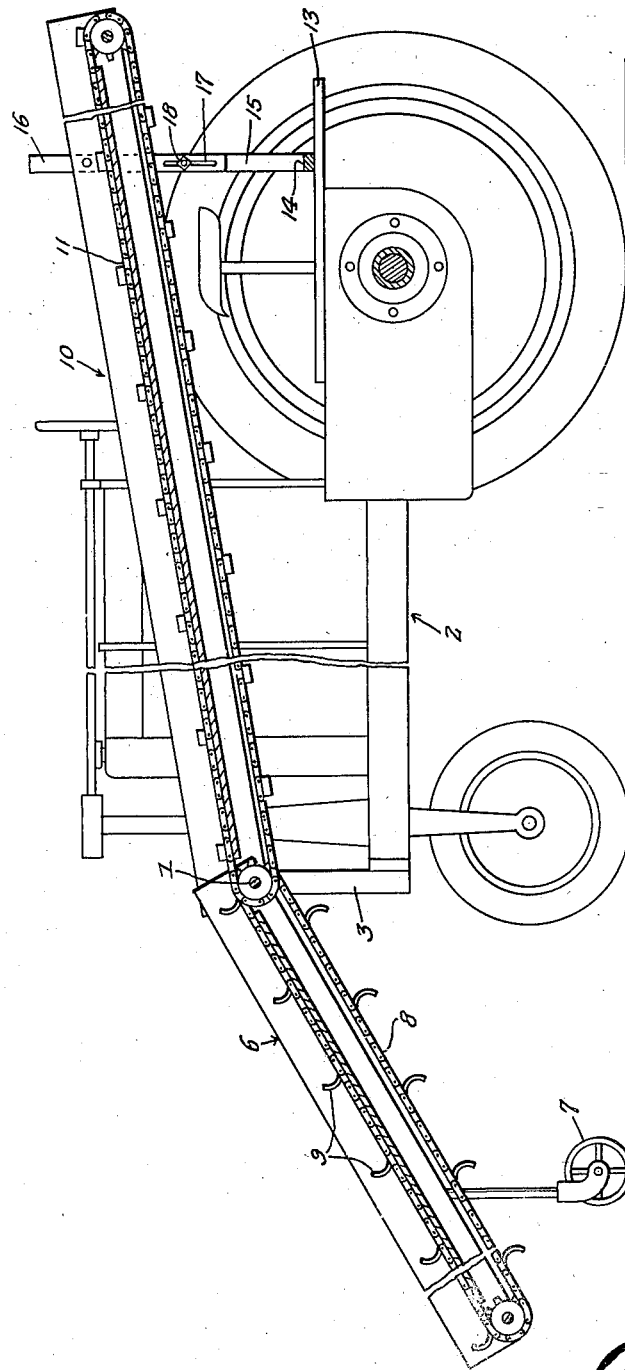
Figure 2 is a view in vertical longitudinal section, taken substantially on the line 2—2 of Figure 1.

Referring now to the drawings in detail, it will be seen that the embodiment of the invention which has been illustrated comprises a drive shaft 1 which is mounted transversely on the front of a tractor 2 through the medium of suitable supports 3. The drive shaft 1 projects beyond the sides of the tractor 2. The drive shaft 1 is operatively connected, at one end, to the usual power take-off 4 of the tractor 2 by a belt and pulley connection 5.

Mounted for swinging movement in a vertical plane on the other end portion of the shaft 1 and projecting forwardly and downwardly therefrom is a pick-up conveyor 6. The free forward end of the pick-up conveyor 6 is supported by suitable caster wheels 7. The conveyor 6 includes a pair of spaced, parallel endless chains 8 which are driven by the shaft 1, said chains being provided with bale engaging and retaining fingers or prongs 9.

An elevating conveyor 10 has one end journaled on the shaft 1 for swinging adjustment in a vertical plane and extends rearwardly and upwardly therefrom adjacent one side of the tractor 2. The elevating conveyor 10 includes an endless drag chain 11 which is also driven by the shaft 1.

The rear end of the conveyor 10 is supported for vertical adjustment on a frame structure 12 which is mounted on the rear end portion of the tractor 2. The frame structure 10 includes what may be considered a base portion 13 having mounted thereon a laterally projecting bar 14. Posts 15 rise from the bar 14. Adjustably mounted on the posts 15 are extensions 16 between which the upper end portion of the conveyor 10 is secured. The extensions 16 are provided, in their lower end portions, with slots 17 which accommodate the securing bolts 18.

It is thought that the operation of the machine will be readily apparent from a consideration of the foregoing. Briefly, the tractor 2, with the loader thereon, is moved across the field and the bales of hay, straw, et certera, that have been previously left therein are picked up by the conveyor 6. From the conveyor 6 the bales are carried upwardly and rearwardly by the elevating conveyor 10 and deposited in a wagon or any other suitable vehicle (not shown) that is to be connected by a short hitch to the rear end of the tractor 2 in a manner to be drawn thereby. It will thus be seen that the bales may be expeditiously loaded with a minimum of manual effort by but two men, one to operate the tractor and the other to place the bales in the wagon. When the loader is not in use, the pick-up conveyor 6 may be conveniently swung upwardly and rearwardly to an out-of-the-way position over the elevating conveyor 10. Also, the machine may be removed from the tractor when desired with a minimum of effort.

It is believed that the many advantages of a bale pick-up and loading machine constructed in accordance with the present invention will be readily understood, and although a preferred embodiment of the device is as illustrated and described, it is to be understood that changes in the details of construction and in the combination and arrangement of parts may be resorted to which will fall within the scope of the invention as claimed.

What is claimed is:

The combination with a tractor of the type including a power take-off on one side, of a bale loading machine operable on the other side of the tractor, said machine including a shaft journaled transversely on the front of the tractor and projecting laterally therefrom, a pick-up conveyor mounted for swinging movement in a vertical plane on one end portion of the shaft and operatively connected thereto for actuation thereby, caster wheels supporting one end of said pick-up conveyor, an elevating conveyor pivotally mounted for swinging adjustment in a vertical plane on said one end portion of the shaft and operatively connected thereto for actuation thereby, said elevating conveyor for receiving bales from the pick-up conveyor, means operatively connecting the other end portion of the shaft to the power take-off of the tractor, and means on the rear portion of the tractor for adjustably supporting one end of the elevating conveyor.

WALTER O. SPRINKLE.